United States Patent [19]

Kruse

[11] Patent Number: 5,198,306

[45] Date of Patent: Mar. 30, 1993

[54] RECORDING TRANSPARENCY AND METHOD

[75] Inventor: Jurgen M. Kruse, Clinton, Conn.

[73] Assignee: Xaar Limited, Cambridge, England

[21] Appl. No.: 545,849

[22] Filed: Jun. 29, 1990

Related U.S. Application Data

[63] Continuation-in-part of Ser. No. 231,656, Aug. 10, 1988, abandoned, which is a continuation of Ser. No. 17,784, Feb. 24, 1987, abandoned.

[51] Int. Cl.$^5$ .............................................. B41M 5/00
[52] U.S. Cl. ................................... 428/481; 346/135.1; 427/146; 428/195; 428/329; 428/331; 428/480; 428/532
[58] Field of Search ..................... 346/135.1; 428/195, 428/331, 480, 532, 329, 481; 427/146

[56] References Cited

U.S. PATENT DOCUMENTS

| | | | |
|---|---|---|---|
| 4,446,174 | 5/1984 | Maekawa et al. | 428/206 |
| 4,503,111 | 3/1985 | Jaeger et al. | 428/195 |
| 4,528,242 | 7/1985 | Burwasser | 428/413 |
| 4,555,437 | 11/1985 | Tanck | 428/212 |
| 4,575,465 | 3/1986 | Viola | 428/480 |
| 4,636,805 | 1/1987 | Toganoh et al. | 346/1.1 |
| 4,642,247 | 2/1987 | Mouri et al. | 427/214 |
| 4,649,064 | 3/1987 | Jones | 428/195 |
| 4,686,118 | 3/1987 | Arai et al. | 427/261 |
| 4,775,594 | 10/1988 | Desjarlais | 428/421 |
| 4,781,985 | 11/1988 | Desjarlais | 428/480 |

FOREIGN PATENT DOCUMENTS

| | | | |
|---|---|---|---|
| 3510565 | 9/1985 | Fed. Rep. of Germany | 428/195 |
| 61-19389 | 1/1986 | Japan | 428/195 |
| 61-78687 | 4/1986 | Japan | 428/195 |

OTHER PUBLICATIONS

Union Carbide Corporation CELLOSIZE® Hydroxyethyl Cellulose (HEC) Product Information Brochure (undated).

*Primary Examiner*—Pamela R. Schwartz
*Attorney, Agent, or Firm*—Marshall, O'Toole, Gerstein, Murray & Bicknell

[57] ABSTRACT

A recording transparency and method of preparing the same from water solution are disclosed. The transparency is receptive to a wide variety of inks and other indicia, exhibits rapid ink drying times, excellent dot size and shape retention, and excellent water resistance and stability. The transparency comprises a transparent substrate coated from an aqueous solution of a polymeric sorbent selected from synthetic transparent cellulosic polymers, especially one or a mixture of hydroxyethyl cellulose polymers, and a surfactant composition comprising nonionic detergent, anionic detergent and complexing agent.

48 Claims, No Drawings

RECORDING TRANSPARENCY AND METHOD

CROSS-REFERENCE TO RELATED APPLICATIONS

This is a continuation-in-part of copending, commonly assigned application Ser. No. 07/231,656 filed Aug. 10, 1988, which is a continuation of application Ser. No. 07/017,784 filed Feb. 24, 1987, now abandoned.

BACKGROUND OF THE INVENTION

1. Field of the Invention

This invention relates generally to recording or printing media and, more particularly, this invention relates to a recording transparency useful in connection with ink jet and other recording processes.

2. Description of Related Art

The use of recording transparencies in connection with, for example, overhead projection systems is well known. Typical recording transparencies comprise a flexible substantially transparent film, usually of a hydrophobic polymeric material such as polyester, with a surface coating which accepts various indicia, such as inks from ink jet printers or pens and the like.

It is desirable that the surface coating be substantially clear and capable of providing high density images which are permanent and smear resistant. It is also important that images imparted to the coating dry quickly. The latter characteristic is generally a function of the rate of ink sorption, while smear resistance is principally determined by the hydrolytic stability of the coating.

While some prior coatings used in recording transparencies have provided acceptable ink drying times and/or smear resistance for various specific types of inks, it is desirable for a recording transparency to accept any of a wide range of indicia, including indicia from ink jet printers, solvent based inks such as used in marker pens, and xerographic toners. Such transparencies would be highly versatile in a commercial setting, allowing users to utilize more than one type of printer, marker or copier to produce a given transparency. Heretofore, recording transparencies having the versatility to accept different types of inks and/or toners while providing fast drying times and smear resistance have not been known.

Also, because of the hydrophobic nature of the film surface, the coating of the film with the ink receptive layer is usually done from a solvent.

SUMMARY OF THE INVENTION

It is an object of the invention to overcome one or more of the problems described above.

It is a further object to provide the coating of the clear film from aqueous solution or suspension. Coating from water is not only safer but also avoids environmental problems with the storage and recovery or disposal of solvents.

According to the invention, a recording transparency comprising a substantially transparent substrate having a hydrophilic surface bearing a substantially transparent coating is provided. The coating is applied to the hydrophilic surface of the substrate by application of an aqueous coating solution, followed by evaporation of the water in the solution.

The coating solution comprises an aqueous solution of at least one transparent cellulose polymer, such as a hydroxyethyl cellulose polymer, as a polymeric sorbent in a sufficiently high concentration to provide a desirably high rate of indicia sorption and drying, while having a sufficiently high viscosity to be readily coatable on the substrate surface. The coating solution also contains a multi-component surfactant composition to promote leveling and adhesion to the surface, and may optionally include hydrated alumina and/or silica in order to impart pencil tooth to the surface if desired.

Other objects and advantages of the invention will be apparent to those skilled in the art from a review of the following detailed description, taken in conjunction with the appended claims.

DETAILED DESCRIPTION OF THE INVENTION

According to the invention, a substantially clear transparency coating having the attributes of fast drying time (i.e. rapid sorption of inks or other indicia applied to the coating) as well as excellent hydrolytic stability (providing smear resistance) and which is readily receptive to a wide variety of indicia (including water and solvent based inks, ink jet inks, dry xerographic toners, pencil indicia, etc.) and which is substantially free of coating defects such as non-uniformity and incomplete coating of the substrate, is provided for the first time.

These properties result from the formation of a transparency coating by the application and drying of an aqueous coating solution a polymeric sorbent comprising one or more transparent cellulose polymers. The solution also contains a multi-component surfactant composition whose composition is described below. The polymeric sorbent is present in a concentration and has an average molecular weight and molecular weight distribution such that there is sufficient relatively low molecular weight polymer to provide good ink sorption rate characteristics, with sufficient relatively high molecular weight polymer to impart a solution viscosity which allows ready coating of the substrate.

Thus, it has been found that coating characteristics balancing a desirably high rate of ink sorption with the desirably high hydrolytic stability provided by higher molecular weight materials can be provided using transparent cellulose polymers, either singly or in admixture.

The transparent cellulose polymers include hydroxyethyl cellulose polymers, and others, such as hydroxymethyl cellulose polymers, hydroxypropyl cellulose polymers, and other hydroxyalkyl cellulose polymers having 3 or more carbon atoms in the alkyl group thereof, carboxyalkyl cellulose polymers, such as carboxymethyl cellulose polymers, and alkali metal (e.g. sodium) salts of carboxy alkyl cellulose polymers Hydroxyethyl cellulose polymers are preferred.

More specifically, it has been found that an aqueous solution containing one or more hydroxyethyl cellulose polymers in a total concentration range of about 0.25 to about 7 weight percent, inclusive, with a distribution of polymer molecular weight to provide a solution viscosity of between about 100 and about 4000 cps, inclusive (as measured at 25° C.), will provide a transparency coating having all of the desirable properties set forth above.

Preferably, the hydroxyethyl cellulose polymers are present in the coating solution in a concentration within the range of about 2 to 6 weight percent, inclusive, and the solution viscosity is in the range of about 200 to about 2000 cps, inclusive. (Reference herein to solution viscosity is understood to mean LVF Brookfield viscosity as measured at 25° C.)

The substantially transparent substrate will generally be of a polymeric material, which typically will be hydrophobic. It is necessary only that the surface to be coated be hydrophilic, and techniques for treating hydrophobic materials to render their surfaces hydrophilic are well known in the art.

A preferred transparency substrate material is a polyester film marketed by Imperial Chemical Industries (ICI) under the trademark MELINEX, Type 519 or 582. This polyester film is hydrophobic, but is pretreated to render its surfaces hydrophilic. Another transparency substrate material which is believed to be useful is marketed by Hoechst under the trademark HOSTAPHAN 4660.

Hydroxyethyl cellulose (HEC) polymers are commercially available. Those which are currently preferred are marketed by Union Carbide Corporation under the trademark CELLOSIZE. CELLOSIZE hydroxyethyl cellulose is available in a wide range of viscosity grades which are believed to differ primarily in average molecular weight and molecular weight distribution.

Although the actual average molecular weight and molecular weight distributions of the Union Carbide CELLOSIZE HEC products are not believed to be publicly available, viscosity data for these materials, which are directly correlatable to molecular weight, are available.

According to the invention, it has been found that the use in a coating solution of relatively high molecular weight hydroxyethyl cellulose polymers provides good water resistivity and stability to transparency coatings. However, the use of only high molecular weight materials tends to provide very viscous solutions and, because of relatively low water solubilities of HEC polymers provides coatings which have a poor capacity for ink jet inks, for example.

Conversely, the use of low molecular weight HEC polymers provides a solution having a viscosity which allows ready coating, but which is relatively sensitive to relative humidity and water, thus providing poor smear resistance.

Thus, it has been found that the use in aqueous solution of a single hydroxyethyl cellulose polymer having an intermediate average molecular weight or a mixture of relatively low and high molecular weight materials in aqueous solution provides an excellent balance between sorption capacity and drying rate on the one hand and hydrolytic stability on the other. It is believed that the ability to provide quick drying times with excellent image formation is a result of having a sufficiently high number of low molecular weight molecules in the coating, while hydrolytic stability results from the presence of a sufficiently high number of high molecular weight molecules in the coating.

It has been further found that these desirable properties are correlatable with the polymer concentration and the viscosity of the coating solution.

Thus, according to the invention, an aqueous solution of one or more hydroxyethyl cellulose polymers having a total polymer concentration in the range of about 0.25 to about 7 weight percent, inclusive, as well as a solution viscosity of between about 100 and 4000 cps, inclusive, will provide good results.

Preferably, the polymer concentration is in the range of about 2 to 6 weight percent, inclusive, highly preferably in the range of about 3 to 4 weight percent, and the viscosity is in the range of about 200 to about 2000 cps, inclusive. Conveniently, the solution may comprise a mixture of hydroxyethyl cellulose polymers dissolved in water.

If a single hydroxyethyl cellulose polymer is to be used, a convenient choice is Union Carbide's CELLOSIZE QP40, which is characterized as having a 2 weight percent aqueous solution viscosity in the range of 80–145 cps at 25° C. using a number 1 spindle at 30 rpm.

If a mixture of two or more HEC polymers is to be used, a convenient low molecular weight polymer is CELLOSIZE QP09H or QP09L. Grade QP09L has a viscosity range of 75–112 cps (5 weight percent aqueous solution, spindle number 1, 30 rpm) and grade QP09H has a viscosity range at 25° C. of 113–150 cps (5 weight percent aqueous solution, spindle number 1, 30 rpm).

Although CELLOSIZE QP09H or L grade hydroxyethyl cellulose may be used alone to provide good ink sorption characteristics, they are preferably used in admixture with at least one relatively high molecular weight HEC, such as the preferred QP4400 or the intermediate molecular weight QP300. QP4400 HEC has a Brookfield viscosity at 25° C. of 4800 to 5600 cps (2 weight percent aqueous solution, spindle number 4, 60 rpm) while QP300 HEC has a viscosity range of 250–400 cps at 25° C. (2 weight percent aqueous solution, spindle number 2, 60 rpm).

Aqueous solutions of QP09 with QP4400 or with a mixture of QP4400 and QP300 give clear transparency coatings with sufficient ink sorption capacity for the Hewlett Packard (HP), Siemens, and Canon ink jet printers. Drying times for the HP unit (the slowest drying of these units) are on the order of 8–25 seconds to a nonsmudging state using a solution containing 6 weight percent QP09H, and 1 weight percent of a mixture of QP4400 and QP300. This type of coating is also receptive to a glycol based ink in pens which will dry smudge free in less than one second, or a water based ink in pens which will dry to a smudge free state in less than 5 seconds.

The solution preferably should contain no more than about 1.5 weight percent, preferably 0.3 to 1.5 weight percent, of the relatively high molecular weight HEC polymer, and this solution should contain no more than 7 weight percent of all HEC polymers.

If desired, an antifoam agent such as Antifoam T (Andrews) or Nopco's Foam Master DF160L may be used. Although not generally necessary, these materials do not adversely affect performance. Typical usage rates of antifoam materials are about 0.01 weight percent.

The coating solution of the invention also contains a multi-component surfactant composition which minimizes the development of coating defects such as nonuniformity and incomplete coating of the substrate. In accordance with the invention, this composition comprises a nonionic detergent, an anionic detergent and a complexing agent. It is an essential feature of the invention that the composition contains all three of these components. Absent this surfactant composition or any one of the three components, the coating may be nonuniform and/or incompletely cover the substrate.

As the anionic detergent may be mentioned organic sulfonates, especially alkyl-substituted aromatic sulfonates such as alkylaryl sulfonates wherein the alkyl group is a linear long chain alkyl group. Examples of nonionic detergents suitable for use in the composition are alkoxylated alkyl phenols such as polyethoxy nonyl phenol. The complexing agents will normally be selected from mono- and polydentate ligands such as EDTA.

A preferred surfactant is marketed by International Products Corporation under the trademark MICRO, which comprises a mixture of linear alkyl aryl sulfonate, polyethyloxylated nonyl phenol and EDTA. It has been found not only to promote adhesion and eliminate occasional surface defects but also not to retard the rate of ink drying or cause excessive foaming. A surfactant concentration range of about 0.05 to 0.2 weight percent should be used. At higher concentrations, the solution becomes foamy, and below the lower end of the range the effects of the surfactant are insufficient for practical purposes.

In practice, when the transparency is produced by rod coating, a relatively dilute solution and larger rod sizes are preferred. For example, a solution having a 6 weight percent QP09 concentration is too viscous for rod cutting. Also, since QP300 HEC contributes to viscosity with only a marginal benefit to drying rate, it may be eliminated if desired.

Although relatively dilute solutions coated in thicker layers should give very similar results to relatively viscous coated in thin layers, in practice relatively viscous solutions apply more material so that for rod coating a viscosity range of up to 400 poise is desirable, with an optimum near 300 or 400.

The hydrophilic coatings made according to the invention sorb ink from HP, Canon and Siemens ink jet systems with excellent retention of dot shape and size. Also, these coatings sorb ink from glycol based marker pens and water based ink pens, and provide excellent images with xerographic dry toners. They serve extremely well for the transparency, a gritty coating which provides good pencil tooth may be obtained by the inclusion in the coating solution of hydrated alumina and/or silica; preferably hydrated alumina with very minor amounts of silica. A preferred alumina is marketed by Degussa under the trademark ALUMINA.C, a high surface area (e.g. 100 m²/g) fumed alumina having low average particle size (about 200 nm) so that scattering of light is minimized and the coatings remain relatively clear. Any silica used in the coating should be very fine grained and may be wax coated in order to minimize scattering. A preferred silica is SCM's Silcron G-530. The coating preparation should be carried out in order to provide as uniform a dispersion of the alumina and silica as possible. To this end, the alumina and silica may be predispersed in water and added to the bulk of the coating solution.

The following table provides examples of various formulations, solution viscosity and ink drying times using the Hewlett Packard ink jet printer:

TABLE

| Sample | QP 09 % | QP 4400 % | QP 300 % | Micro % | Coating Solution Viscosity (cps) | HP Ink Drying Time (Sec) |
|---|---|---|---|---|---|---|
| 1 | 6* | 1.5 | 1.0 | 0.1 | 3800 | 9 |
| 2 | 6 | 1.5 | 1.0 | 0.1 | 3100 | 12 |
| 3 | 6 | 1.5 | — | 0.1 | 1500 | 13 |
| 4 | 4 | 1 | — | 0.1 | 380 | 13 |
| 5 | 4* | 1 | — | 0.1 | 420 | 14 |
| 6 | 3.3* | 1 | 1 | 0.1 | 700 | 12 |
| 7 | 3.3 | 1 | — | 0.1 | 240 | 17 |
| 8 | 4 | 0.8 | — | 0.1 | 220 | 16 |

*denotes QP09H; other samples used QP09L

The following exemplary formulations and procedures further illustrate the practice of the invention. 6.5 g QP09L HEC polymers and 0.2 weight% MICRO surfactant were added to 100 g water and dissolved by stirring. To this solution was added a slurry of 0.8 g Alumina-C hydrated alumina and 0.1 g Silcron G-530 coated silica in 10 to 30 ml water. The resultant slurry was stirred for several hours and then rod coated on a polyester film (Melinex 519) using a size 40-55 rod. The resultant coating, after drying, was clear in appearance, gave drying times of 60 to 20 sec with the HP and Canon ink jet printers, accepted both water based and glycol based ink pens and ball point pens (drying times less than 3 sec) and would also accept 5H pencil, K-4 plastic pencil, and normal ball point ink. The pencil lines could be erased, and redrawn in the erased areas.

Other materials tested and found satisfactory included QP09H HEC at 0.25-7% either alone or mixed with 0.3 to 0.75% QP 4400 HEC (total HEC concentration no more than 7%); MICRO surfactant concentrations of 0.05 to 0.2%; Alumina-C alumina levels of 0.75 to 2%; and Silcron G-530 coated silica levels of 0.1 to 0.3%.

The fastest drying HP Thinkjet ink was observed with 2.5% QP09H HEC and 0.7% QP 4400 HEC and a fine grained silica. However, the sample was very hazy and opaque. Using 2.5% QP09H HEC, 0.75% QP 4400 HEC, 1.0% Alumina-C alumina and 0.2% Silcron G-530 silica, drying times of about 4 sec could be obtained.

Similar results to those reported above may be obtained when the hydroxyethyl cellulose polymer in the solution is replaced by other synthetic transparent cellulosic polymers, e.g. hydroxypropyl cellulose, carboxymethyl cellulose and alkali metal salts of carboxymethyl cellulose.

By way of comparison, replacing the MICRO surfactant composition by the following surfactants resulted in coatings which were unacceptable in that they were non-uniform or failed to coat the substrate completely:
Tergitol 15-15-9 which is a polyethylene glycol ether of a secondary alcohol (nonionic);
Triton X-45 and X-165 which are octyl phenoxy polyethoxy ethanols (nonionic);
Various petroleum derivatives marketed under the trade names Foamaster NS-1, KFS, and DF 122 NS (nonionic);
Various organic polymer blends marketed under the trade names Nalco 7511 and Nalco 212 (nonionic);
Dodecyl sodium sulfate (anionic);
Phosphate ester sold under the trade name Findet SB (anionic); and,
A mixture of a Triton nonionic surfactant and an anionic surfactant of the sulfonate type.

In further comparative experiments, the MICRO surfactant composition was replaced by EDTA alone but the resultant coating was imperfect.

The foregoing detailed description is given for clearness of understanding only, and no unnecessary limitations should be understood or inferred therefrom, as obvious modifications within the scope of the invention will be apparent to those skilled in the art.

I claim:

1. A recording transparency comprising:
   (a) a substantially transparent substrate having a hydrophilic surface; and
   (b) a substantially transparent hydrophilic coating applied to said surface by coating said surface with an aqueous coating solution followed by evaporation of the water from said solution, said solution comprising a polymeric sorbent dissolved in water and a multi-component surfactant composition comprising a nonionic detergent, an anionic detergent and a complexing agent, said polymeric sorbent being selected from transparent synthetic cellulosic polymers other than hydroxyethyl cellulose polymers and the concentration, average molecular weight and molecular weight distribution of said polymeric sorbent being selected such that said coating solution has a viscosity so as to be readily coatable on said surface and said coating provides a desired high rate of sorption and drying of indicia applied thereto.

2. The transparency of claim 1 wherein said polymeric sorbent is selected from the group consisting of hydroxymethyl cellulose polymers, hydroxyalkyl cellulose polymers having 3 or more carbon atoms in the alkyl group thereof, carboxyalkyl cellulose polymers, and alkali metal salts of carboxyalkyl cellulose polymers.

3. The transparency of claim 1 wherein said polymeric sorbent is selected from the group consisting of hydroxypropyl cellulose polymers, carboxymethyl cellulose polymers, and sodium salts of carboxymethyl cellulose polymers.

4. A recording transparency comprising:
   (a) a substantially transparent substrate having a hydrophilic surface; and
   (b) a substantially transparent hydrophilic coating applied to said surface by coating said surface with an aqueous coating solution followed by evaporation of the water from said solution, said solution comprising a polymeric sorbent dissolved in water and a multi-component surfactant composition comprising a nonionic detergent, an anionic detergent and a complexing agent, said polymeric sorbent consisting essentially of at least one hydroxyethyl cellulose polymer and the concentration, average molecular weight and molecular weight distribution of said polymeric sorbent being selected such that said coating solution has a viscosity so as to be readily coatable on said surface and said coating provides a desired high rate of sorption and drying of indicia applied thereto.

5. The transparency of claim 4 wherein said polymeric sorbent comprises a mixture of hydroxyethyl cellulose polymers.

6. The transparency of claim 4 wherein the concentration of said polymeric sorbent in said coating solution is within the range of about 0.25 to 7 weight percent, inclusive, and the viscosity of said solution is between about 100 and 4000 cps, inclusive, as measured at 25° C.

7. The transparency of claim 6 wherein said concentration is in the range of about 2 to 6 weight percent, inclusive, and said viscosity is in the range of about 200 to about 2000 cps, inclusive.

8. The transparency of claim 6 wherein said polymeric sorbent includes a first hydroxyethyl cellulose polymer having an average molecular weight such that a 5 weight percent aqueous reference solution thereof has a viscosity in the range of about 75 to 150 cps at 25° C.

9. The transparency of claim 8 wherein said polymeric sorbent includes a second hydroxyethyl cellulose polymer having an average molecular weight such that a 2 weight percent aqueous reference solution thereof has a viscosity in the range of about 4800 cps to 5600 cps at 25° C.

10. The transparency of claim 9 wherein the concentration of the polymer having an average molecular weight such that a 2 weight percent aqueous reference solution thereof has a viscosity in the range of about 4800 cps to 5600 cps at 25° C. is up to 1.5 weight percent.

11. The transparency of claim 9 wherein said polymeric sorbent includes a third hydroxyethyl cellulose polymer having an average molecular weight such that a 2 weight percent aqueous reference solution thereof has a viscosity in the range of about 250 to 400 cps at 25° C.

12. The transparency of claim 11 wherein the concentration of the polymer having an average molecular weight such that a 2 weight percent aqueous reference solution thereof has a viscosity in the range of about 4800 cps to 5600 cps at 25° C. is up to 1.5 weight percent and the concentration of said polymer having an average molecular weight such that a 2 weight percent aqueous reference solution thereof has a viscosity in the range of about 250 to 400 cps at 25° C. is up to 1 weight percent.

13. The transparency of claim 12 wherein said first polymer concentration is in the range of about 2 to 6 weight percent, inclusive.

14. The transparency of claim 12 wherein the concentration of the polymer having an average molecular weight such that a 2 weight percent aqueous reference solution thereof has a viscosity in the range of about 4800 cps to 5600 cps at 25° C. is about 0.3 to 1.5 weight percent, inclusive.

15. The transparency of claim 14 wherein said first polymer concentration is about 3 to 4 weight percent, inclusive.

16. The transparency of claim 8 wherein said polymeric sorbent includes a second hydroxyethyl cellulose polymer having an average molecular weight such that a 2 weight percent aqueous reference solution thereof has a viscosity in the range of about 250 to 400 cps at 25° C.

17. The transparency of claim 16 wherein the concentration of the polymer having an average molecular weight such that a 2 weight percent aqueous reference solution thereof has a viscosity in the range of about 250 to 400 cps at 25° C. is up to 1 weight percent.

18. The transparency of claim 4 wherein said multi-component surfactant composition is present in said coating solution in a concentration in the range of about 0.05 to 2 weight percent, inclusive.

19. The transparency of claim 4 wherein said coating solution further contains a sufficient quantity of hydrated alumina particles or silica particles or a mixture thereof to impart pencil tooth to said coating.

20. The transparency of claim 19 wherein said alumina is present in said coating solution at a concentration of about 0.75 to 2 weight percent, inclusive.

21. The transparency of claim 20 wherein said coating solution further contains silica.

22. The transparency of claim 21 wherein said silica is present in a concentration of about 0.1 to 0.3 weight percent, inclusive.

23. The transparency of claim 4 wherein said substrate comprises a hydrophobic film and said surface is treated to be hydrophilic.

24. The transparency of claim 23 wherein said film comprises a polyester resin.

25. A method of forming a recording transparency comprising the steps of:
   (a) providing a substantially transparent substrate having a hydrophilic surface; and
   (b) applying a substantially transparent hydrophilic coating containing a polymeric sorbent to said surface by coating said surface with an aqueous coating solution of said sorbent followed by evaporating the water in said solution, said solution comprising a polymeric sorbent dissolved in water and a multi-component surfactant composition comprising a nonionic detergent, an anionic detergent and a complexing agent, said polymeric sorbent being selected from transparent synthetic cellulosic polymers other than hydroxyethyl cellulose polymers and the concentration, average molecular weight and molecular weight distribution of said polymeric sorbent being selected such that said coating solution has a viscosity so as to be readily coatable on said surface and said coating provides a desired high rate of sorption and drying of indicia applied thereto.

26. The method of claim 25 wherein said polymeric sorbent is selected from the group consisting of hydroxymethyl cellulose polymers, hydroxyalkyl cellulose polymers having 3 or more carbon atoms in the alkyl group thereof, carboxyalkyl cellulose polymers, and alkali metal salts of carboxyalkyl cellulose polymers.

27. The method of claim 25 wherein said polymeric sorbent is selected from the group consisting of hydroxypropyl cellulose polymers, carboxymethyl cellulose polymers, and sodium salts of carboxymethyl cellulose polymers.

28. A method of forming a recording transparency comprising the steps of:
   (a) providing a substantially transparent substrate having a hydrophilic surface; and
   applying a substantially transparent hydrophilic coating containing a polymeric sorbent to said surface by coating said surface with an aqueous coating solution of said sorbent followed by evaporating the water in said solution, said solution comprising a polymeric sorbent dissolved in water and a multi-component surfactant composition comprising a nonionic detergent, an anionic detergent and a complexing agent, said polymeric sorbent consisting essentially of at least one hydroxyethyl cellulose polymer and the concentration, average molecular weight and molecular weight distribution of said polymeric sorbent being selected such that said coating solution has viscosity so as to be readily coatable on said surface and said coating provides a desired high rate of sorption and drying of indicia applied thereto.

29. The method of claim 28 wherein said solution comprises a mixture of hydroxyethyl cellulose polymers.

30. The method of claim 28 wherein the concentration of said polymeric sorbent in said coating is within the range of about 0.25 to 7 weight percent, inclusive, and the viscosity of said solution is between 100 and 4000 cps, inclusive, as measured at 25° C.

31. The method of claim 30 wherein said concentration is in the range of about 2 to 6 weight percent, inclusive, and said viscosity is in the range of about 200 to about 2000 cps, inclusive.

32. The method of claim 30 wherein said polymeric sorbent includes a first hydroxyethyl cellulose polymer having an average molecular weight such that a 5 weight percent aqueous reference solution thereof has a viscosity in the range of about 75 to 150 cps at 25° C.

33. The method of claim 32 wherein said polymeric sorbent includes a second hydroxyethyl cellulose polymer having an average molecular weight such that a 2 weight percent aqueous reference solution thereof has a viscosity in the range of about 4800 to 5600 cps at 25° C.

34. The method of claim 33 wherein the concentration of the polymer having an average molecular weight such that a 2 weight percent aqueous reference solution thereof has a viscosity in the range of about 4800 cps to 5600 cps at 25° C. is up to 1.5 weight percent.

35. The method of claim 33 wherein said polymeric sorbent includes a third hydroxyethyl cellulose polymer having an average molecular weight such that a 2 weight percent aqueous reference solution thereof has a viscosity in the range of about 250 to 400 cps at 25° C.

36. The method of claim 35 wherein the concentration of the polymer having an average molecular weight such that a 2 weight percent aqueous reference solution thereof has a viscosity in the range of about 4800 cps to 5600 cps at 25° C. is up to 1.5 weight percent and the concentration of said polymer having an average molecular weight such that a 2 weight percent aqueous reference solution thereof has a viscosity in the range of about 250 to 400 cps at 25° C. is up to 1 weight percent.

37. The method of claim 36 wherein said first polymer concentration is in the range of about 2 to 6 weight percent, inclusive.

38. The method of claim 36 wherein the concentration of the polymer having an average molecular weight such that a 2 weight percent aqueous reference solution thereof has a viscosity in the range of about 4800 cps to 5600 cps at 25° C. is about 0.3 to 1.5 weight percent, inclusive.

39. The method of claim 38 wherein said first polymer concentration is about 3 to 4 weight percent, inclusive.

40. The method of claim 32 wherein said polymeric sorbent includes a second hydroxyethyl cellulose polymer having an average molecular weight such that a 2 weight percent aqueous reference solution thereof has a viscosity in the range of about 250 to 400 cps at 25° C.

41. The method of claim 40 wherein the concentration of the polymeric having an average molecular weight such that a 2 weight percent aqueous reference solution thereof has a viscosity in the range of about 250 to 400 cps at 25° C. is up to 1 weight percent.

42. The method of claim 28 wherein said surfactant is present in said coating solution in a concentration in the range of about 0.05 to 2 weight percent, inclusive.

43. The method of claim 28 wherein said coating solution further contains a sufficient quantity of hydrated alumina particles or silica particles or a mixture thereof to impart pencil tooth to said coating.

44. The method of claim 43 wherein said alumina is present in said coating solution at a concentration of about 0.75 to 2 weight percent, inclusive.

45. The method of claim 44 wherein said coating solution further contains silica.

46. The method of claim 45 wherein said silica is present in a concentration of about 0.1 to 0.3 weight percent, inclusive.

47. The method of claim 28 wherein said substrate comprises a hydrophobic resinous film and said surface is treated to be hydrophilic.

48. The method of claim 47 wherein said film comprises a polyester resin.

* * * * *